Dec. 21, 1954
H. FIEDLER
2,697,567
CONTROL FOR STALLPROOF AND SPINPROOF
THREE-CONTROL AIRPLANES
Filed Dec. 22, 1949
2 Sheets-Sheet 1
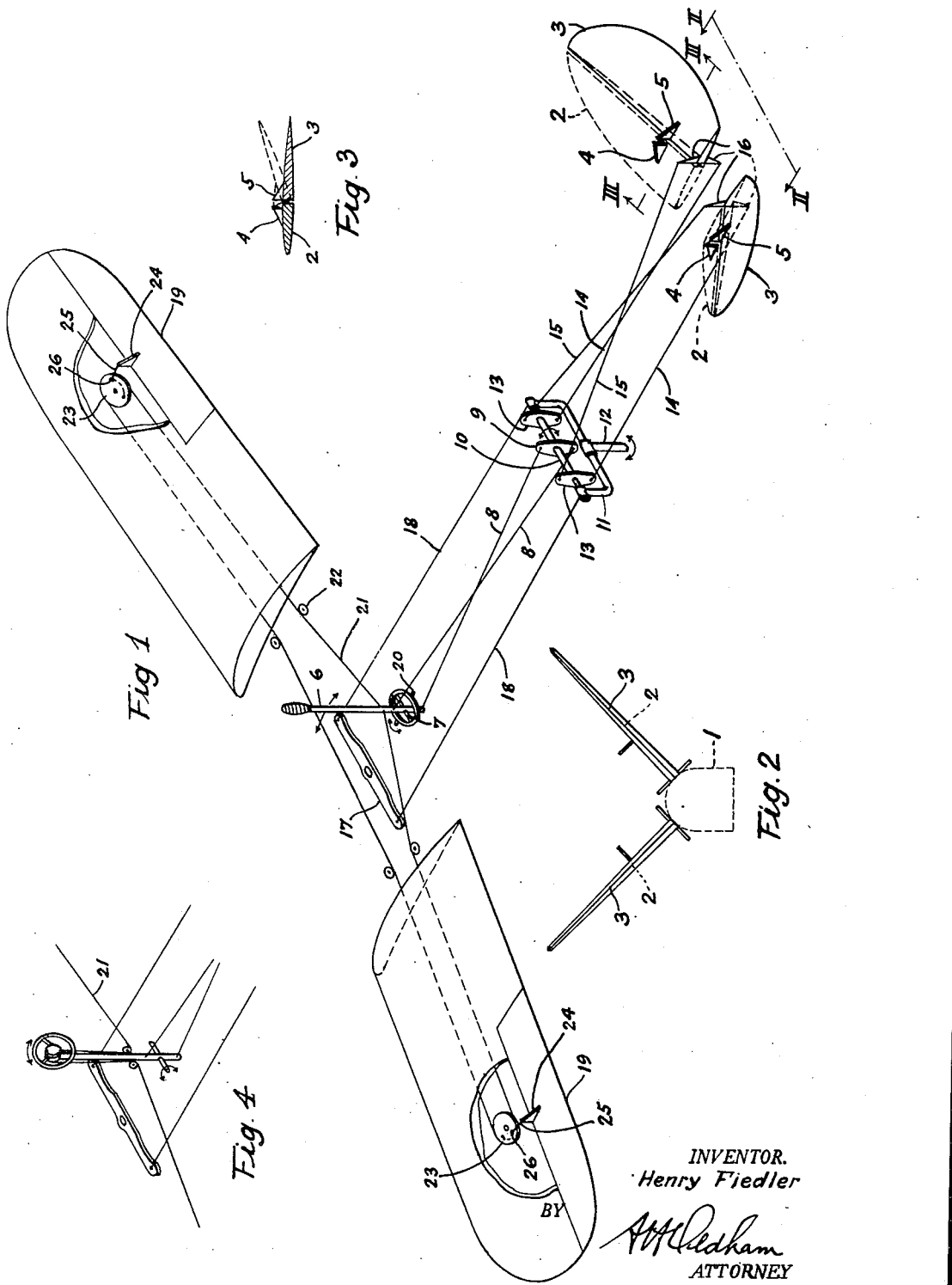
INVENTOR.
Henry Fiedler
BY
ATTORNEY

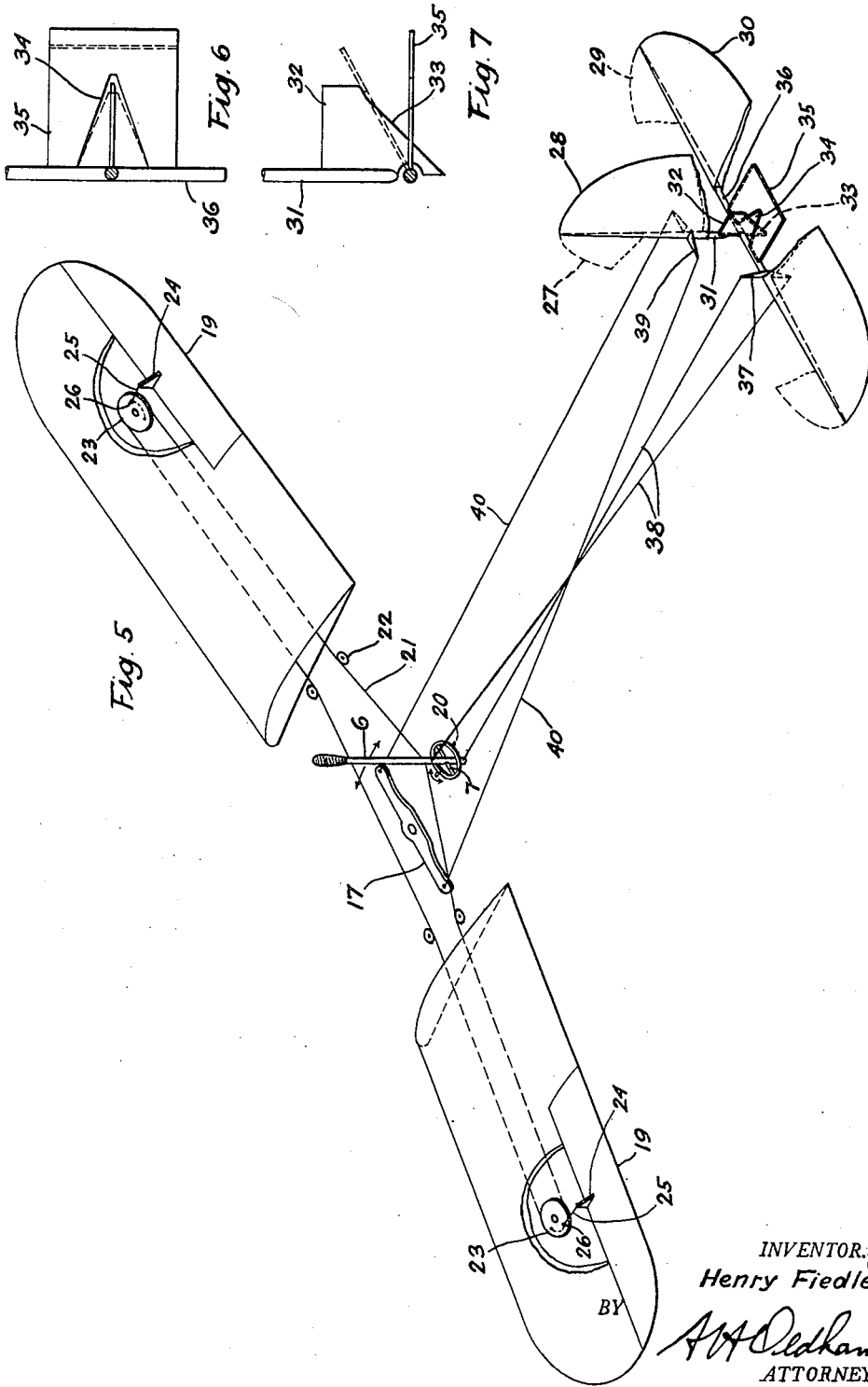

United States Patent Office 2,697,567
Patented Dec. 21, 1954

2,697,567

CONTROL FOR STALLPROOF AND SPINPROOF THREE-CONTROL AIRPLANES

Henry Fiedler, Chicago, Ill., assignor to Goodyear Aircraft Corporation, Akron, Ohio, a corporation of Delaware Application December 22, 1949, Serial No. 134,396

3 Claims. (Cl. 244—83)

This invention relates to the control of airplanes and in particular to a control arrangement for making a three-control airplane stall proof and spin proof. Under the term "three-control airplane" is to be understood an airplane which at normal flight conditions, in contrast to a so-called two-control airplane, mentioned below, has full rudder and elevator travel and full aileron travel independent therefrom such as any conventional airplane.

Heretofore, two-control airplanes have been known to be stall proof and spin proof, however, such constructions have a serious drawback. The limitation of yaw is accomplished by providing a rudder travel of only a few degrees and controlling the rudder with the same control that controls the ailerons. No rudder pedals or other independent means for obtaining rudder control are provided. This lack of independent rudder control prevents the airplane from being under complete control of the pilot in all three directions. A rough uncoordinated ride, especially in gusty weather, is the result. Furthermore, no intentional slips or skids can be performed while attempting to land on a field of limited size or with obstructions. Thus, while a two-control airplane is safe from unintentional stalls or spins, the lack of maneuverability while landing presents a decided hazard under adverse landing conditions.

It is the general object of the invention to avoid and overcome the foregoing and other difficulties of and objections to prior art practices by providing a control arrangement which makes a three-control airplane stall proof and spin proof, and still allows normal independent control in all three directions in all normal flight attitudes, with rudder control being limited only when the airplane is in a rear stalled attitude.

Another object of the invention is to provide in a three-control airplane means to restrict upward elevator movement and to prevent rudder movement at uppermost elevator position, but to allow increasingly rudder movement as the elevator is lowered from its uppermost position to substantially neutral or zero position near which normal rudder deflection is possible and that in all possible elevator-rudder positions the angle of the attack of a wing will remain below stalling and spinning attitude of the airplane.

The aforesaid objects of the invention, and other objects which will become apparent as the description proceeds, are achieved by limiting the movement of the elevator control surfaces in such a way that the angle of attack of the airplane wings will always remain below stalling attitude. Limiting the elevator control as indicated above does not however, prevent the airplane from spinning. For if the rudder is moved abruptly, causing the airplane to yaw rapidly, the airplane can be forced into a spin. However, to prevent a spin the rudder is kept from being moved in near stalled attitude of the airplane to make it stall proof and spin proof, and still allow normal, independent control in all three directions in all normal flight attitudes. Use of rudder would be restricted only at near stalled attitude and would be available for level flight, normal climbs, etc. The invention is applicable for a V-tail system, as well as for a conventional tail system.

In the V-tail system each one of the two control surfaces, acting as rudder and elevator and being placed at an angle of about 90° to each other, is provided with a stop against its respective fin to limit upward movement and to keep the airplane below stalling condition and also to prevent yaw which might initiate a spin. If one of the surfaces is lowered and the other kept at the stop, which is accomplished by easing the stick forward and applying rudder, a yawing force is produced. However, the net vertical force on the tail has thus been reduced to a force which is below that necessary to cause the angle of attack of the wings to reach stalling condition.

For the conventional tail system having a separate rudder and elevator the stops limiting their movements are attached to these movable surfaces in such a way that the movement of the rudder will limit the movement of the elevator, and vice versa, so that under all conditions stalling and spinning of an airplane are excluded.

However, when an airplane is at near stalled attitude, attempting the use of ailerons with conventional linkage may cause the airplane to spin. This may occur because the aileron which is lowered increases the angle of attack of its wing. To avoid such condition, a linkage is applied for differential movement of the ailerons. This linkage, when a turn is intended, raises the aileron of the inner wing to a greatest deflection, whereas the aileron of the outer wing is deflected downwardly a much smaller angle and returns to neutral position while the inner aileron is in highest position, thereby keeping the airplane always in an attitude at which spinning cannot occur.

For a better understanding of the invention reference should be had to the accompanying drawings, wherein:

Fig. 1 is a perspective diagrammatic view of one embodiment of the invention for a V-type tail arrangement.

Fig. 2 is a rear view of the control surfaces taken on line II—II of Fig. 1.

Fig. 3 is a cross-sectional view taken on line III—III of Fig. 1.

Fig. 4 is a modification of the control stick arrangement of Fig. 1.

Fig. 5 is a modification of the invention shown in Fig. 1.

Fig. 6 is a top view in larger size of the elevator and rudder stop plates, and

Fig. 7 is a side view of Fig. 6.

With specific reference to the forms of the invention illustrated in the drawings, the numeral 1 indicates a fuselage which carries fixed tail fins 2 forming together a V-shape. To each fin is hinged a control surface 3 which has the twofold function of rudder and elevator, depending on the direction in which the surfaces are deflected. Stops 4 and 5, opposite each other, are provided on the fins 2 and the control surfaces 3, respectively, to limit upward deflection of the control surface so that the angle of attack of the wings will always remain below the stalling angle. Whereas, a conventional control stick 6, which may take the also conventional form, as shown in Fig. 4, operates the upward and downward movements of the control surfaces 3, by swinging it about the axis 7, thereby shifting a pair of cables 8 connected to the ends of the double lever 9 swingable together with the shaft 10 in the U-shaped frame 11 which is provided with a vertical shaft 12 rotatable in a bearing (not shown). Also fixed to the shaft 10 are a pair of transmission levers 13 connected by control cables 14 and 15 to levers 16 on the control surfaces 3 for operating these surfaces. To operate the tail control surfaces as rudders by a foot pedal lever 17 the ends thereof are connected by cables 18 to the outer ends of the pivoted U-frame 11 which, when turned, will deflect one control surface upwards and the other control surface downwards to produce a yawing motion of the airplane, either to one or the other side. When both control surfaces are in their uppermost position limited by stops 4 and 5, that is, short of bringing the angle of attack of the wings to a stalling attitude, it is still possible, by pushing the control stick somewhat forwards, to apply rudder, for in this case the control surfaces are released from the stops 4 and 5 and allow the foot pedals to operate a certain amount, sufficient to yaw the airplane without reaching stalling or spinning attitude of the wings, since the greatest deflection of one control surface cannot be greater than the stops permit, whereas, the deflection of the other control surface will be less so that a stalling or spinning attitude by such an operation cannot be effected.

To further prevent stalling or spinning of a three-control airplane, but to provide controllability in all three directions under normal flight conditions, not a conventional but a differential control, known as such, is employed for operating the ailerons 19 by tilting the control stick 6, about the pivots 20, or its equivalent construction of the hand wheel type, shown in Fig. 4, by a cable 21 drawn over guide rolls 22 and operating rolls 23 positioned on the wings forward of the ailerons. The ailerons 19 are provided with levers 24, each connected by a link 25 to a pivot 26 fixed to an operating roll 23 at an angle of about 45° from its longitudinal center line, and symmetrical thereto on the opposite wing, for a total rotary movement of about 90°. In operating this differential control by turning the rolls 23 the full amount, one of the ailerons will be deflected upwardly, because, as indicated, pivot 26 moves forward the greatest possible amount, whereas the opposite aileron, because of substantially transverse movement of the pivot 26, will first deflect a small amount downwards while the pivot 26 travels through an angle of about 45°, and, then, in completing its full travel will return to zero position. In this case, neither aileron by itself nor both together, while simultaneously deflecting the control surface described above, are capable of producing a stalling or spinning attitude on a three-control airplane.

In a modification (Fig. 5) is shown a construction similar to that of Fig. 1, however, with the difference that the V-tail system is replaced by a conventional tail system, including a vertical fin 27 having a rudder 28 hinged thereto and a horizontal fin 29 to which is hinged an elevator 30. Each one of these control surfaces is operated separately, however, with their maximum possible deflections being determined by each other, in order to prevent stalling and spinning of the airplane. To that effect the rudder shaft 31, provided with a vertical stop plate 32 having a certain rear contour 33, is inserted into an opening having cooperating contours 34 in the horizontal stop plate 35 which is attached to the elevator shaft 36, best shown in Figs. 6 and 7. These stop contours, however, may assume various shapes, depending on the size and action of the control surfaces on different airplanes. At any rate, the combined effect of the elevator and rudder must always keep the airplane stall proof and spin proof. To the elevator is attached a double lever 37 the ends of which being connected crosswise by cables 38 to the control stick 6, which also operates the ailerons, whereas the rudder provided with a double lever 39 is controlled by cables 40 connected to the foot pedal lever 17. Since the construction and operation of the ailerons in Fig. 5 are identically the same as those shown in Fig. 1, its parts are indicated by the same numerals as shown and described for Fig. 1 no repetition of its description is necessary.

In operating the rudder and elevator it will be seen that their respective deflection is, in upward position of the elevator, dependent on the shape of the cooperating contours of the stop plates 32 and 35, respectively, so that in case one of these control surfaces is deflected the other one can be deflected just so much that their combined effect can never produce a stalling or spinning attitude of the airplane. In full upward position of the elevator which cannot produce stalling the rudder is completely locked by the stop plate 35 of the elevator, whereas, when the rudder is deflected, cooperating stop points along the contours of the stop plates change their position and thereby possible deflection of the elevator. Since the ailerons move differentially, the inner one deflecting fully upwardly and the outer one a much smaller amount downwardly, the angle of attack of a wing-aileron combination is increased only slightly and does not reach the stalling point.

From the foregoing it will be recognized that the invention, as exemplified and described, provides means to make a three-control airplane, having either a V-tail control system or a conventional control system, stall proof and spin proof. The invention is a decided improvement over the present two-control spin proof airplane. No sacrifice in controllability is made to achieve the desired ends, except in the extremely critical attitudes. Three-control airplanes employing either system can be flown fully co-ordinated, preventing "wallowing" in gusty weather which is inherent in the two-control airplane. Further, slips or skids may be accomplished at will at all attitudes where they are normally used while maneuvering for a landing, a feat which is impossible with a two-control system.

While certain representative embodiments and details have been shown for the purpose of illustrating the invention, it will be apparent to those skilled in the art that various changes and modifications may be made therein without departing from the spirit or scope of the invention.

What I claim:

1. In combination with a three-control airplane of conventional design including a fuselage, supporting wings, ailerons hinged to the wings, a horizontal fin, an elevator hinged to the horizontal fin, a vertical fin, a rudder hinged to the vertical fin, a locking plate being centrally and horizontally positioned in said elevator and having a central front cut-out, a locking plate positioned at the bottom of the rudder substantially at right angle with and passing through the cut-out of said horizontal locking plate and being in cooperating engagement therewith for mutually restricting the motion of both elevator and rudder at upward deflection of the elevator to prevent stalling and spinning at any possible attitude of the elevator and rudder, the rudder in normal flight being unrestricted in its motion at near neutral position of the elevator.

2. In combination with a three-control airplane of conventional design including a fuselage, supporting wings, ailerons hinged to the wings, a horizontal fin, an elevator hinged to the horizontal fin, a vertical fin, a rudder hinged to the vertical fin, stop means carried by the elevator in substantially the plane thereof and defining rearwardly converging surfaces substantially symmetrical to the rudder axis and stop means associated with the rudder near the bottom and in substantially the plane thereof and defining a forwardly and downwardly directed surface extending between said converging surfaces for cooperative engagement therewith to prevent rudder motion when the elevator is in uppermost position below stalling attitude of the airplane and gradually releasing both elevator and rudder for normal deflection as the elevator nears neutral position.

3. In an airplane, the combination of means for determining the position of the airplane about its lateral axis comprising an elevator and an elevator control mechanism including a hand-operated control member; means for determining the position of the airplane about its vertical axis comprising a rudder and a separate foot-operated control mechanism; a deflection limiting means connected to said first mentioned means and movable in response to upward deflection of said elevator; and a deflection limiting means connected to said second mentioned position determining means in spaced relation to said first mentioned deflection limiting means and movable in response to lateral deflection of said rudder, said two deflection limiting means being adapted to be moved toward each other for inter-engagement in simultaneous deflections of said elevator and said rudder beyond a deflection range spin proof to the airplane.

References Cited in the file of this patent

UNITED STATES PATENTS

| Number | Name | Date |
|---|---|---|
| 1,565,097 | Mummert | Dec. 8, 1925 |
| 1,848,037 | Weick | Mar. 1, 1932 |
| 2,110,516 | Weick | Mar. 8, 1938 |
| 2,424,889 | Holmes | July 29, 1947 |